United States Patent
Parker

[15] 3,648,156
[45] Mar. 7, 1972

[54] QUIET SLOT SCANNING

[72] Inventor: Leslie Kearton Parker, High Wycombe, England

[73] Assignee: Perkin-Elmer Limited, Beaconsfield, Buckinghamshire, England

[22] Filed: May 26, 1970

[21] Appl. No.: 41,695

Related U.S. Application Data

[63] Continuation of Ser. No. 732,697, May 28, 1968, abandoned.

[52] U.S. Cl. .................................................324/0.5 R
[51] Int. Cl. ...................................................G01n 27/78
[58] Field of Search.....................................324/0.5

[56] References Cited

UNITED STATES PATENTS

3,068,399 12/1962 Bloch.....................................324/0.5

OTHER PUBLICATIONS

R. Kaiser–Double Resonance Techniques for the Elimination of Proton Spin–Spin Splitting in High–Resolution PMR Spectra– Rev. of Sci. Instr.– 31(9)– 9/60 pp. 963– 965.

R. Ernst– Nuclear Magnetic Double Resonance with an Incoherent Radio– Frequency Field– Journal of Chem. Phys.– 45(10)– 11/15/66 pp. 3845– 3861

E. B. Baker et al.,– Two Synthesizer– Nuclear Spin Decoupling– INDOR Spectroscopy– Rev. of Sci. Instr.– 34(3)– 3/63 pp. 243– 246.

Primary Examiner—Michael J. Lynch
Attorney—Edward R. Hyde, Jr.

[57] ABSTRACT

Decoupling of multiple resonances in a nuclear magnetic resonance analysis is provided by subjecting the sample to radio frequency decoupling energy centered about an RF sample irradiating frequency $f_1$. The radio frequency decoupling energy defines a quite slot characterized by the absence of decoupling energy and which is symmetrical about the frequency $f_1$. As sample scanning occurs, the slot progresses through the spectrum thereof enabling observance of an N.M.R. resonance substantially free from spin-coupling.

6 Claims, 3 Drawing Figures

QUIET SLOT SCANNING

This is a continuation of application Ser. No. 732,697, filed May 28, 1968, now abandoned.

This invention relates to N.M.R. (Nuclear Magnetic Resonance) spectroscopy and in particular to a method of and apparatus for decoupling spin-coupled gyromagnetic nuclei.

Gyromagnetic nuclei in adjacent chemical groups of a molecule may be spin coupled so as to give rise to multiple resonances or multiplets in the observed spectrum of the coupled groups. Although the presence of multiplets is itself of considerable analytical significance, the interpretation of the spectrum may be greatly assisted by simplifying the multiplets as far as possible - ideally, into single resonances or singlets.

Multiple resonances arise from the fact that the affected nuclei experience a disturbing influence from magnetic fields due to neighboring nuclei and are then subjected to an effective polarizing field which is the resultant of both the normal N.M.R. magnetic field ($H_o$) and the disturbing magnetic fields. Since the neighboring nuclei may assume a number of permitted orientations in the N.M.R. magnetic field and have a finite residence time in each of them, there may be set up several discrete values of effective polarizing field giving rise to a like number of resonances. The simplest case is that of protons, which have two permitted orientations, viz parallel with the polarizing field and antiparallel, with the result that two spin-coupled protons produce double resonances.

A known decoupling technique consists in subjecting the sample under analysis to the normal irradiating RF power ($H_1$) at the Larmor frequency of the observed nuclei while superimposing on it a decoupling RF power ($H_2$) at the Larmor frequency of the disturbing nuclei sufficiently intense to "saturate" the resonances thereof, i.e., to cause in the disturbing nuclei state transitions at such a high rate, compared with their relaxation time, that the observed nuclei will experience in effect a disturbing field of substantially zero average, with the result that many multiplets originally present will be greatly simplified.

Unfortunately, a chemical group under observation may be spin coupled to nuclei belonging to more than one neighboring group, and this requires a separate decoupling RF frequency for each separate coupling, with attendant complexity and cost of equipment and inconvenience to the user.

It is an object of the present invention to provide an improved method and apparatus for decoupling spin-coupled gyromagnetic nuclei.

According to the present invention there is provided a method of decoupling spin-coupled gyromagnetic nuclei in N.M.R. spectroscopy and thus generate a simplified N.M.R. signal, wherein the N.M.R. sample is subjected to the normal irradiating RF power ($H_1$) and in addition is subjected to a decoupling RF power ($H_2$) which is adapted for saturating resonances over a region of the N.M.R. spectrum while leaving substantially unaffected a middle zone or quiet slot thereof. The quiet slot extends between limits which are substantially equidistant from a position on the spectrum corresponding to the irradiating RF power. As the sample is scanned in either the frequency scan or the field scan mode, the quiet slot flanked by saturated zones thereby progresses along the abscissa of the spectrum and enables a resonance occurring in a chemical group of the N.M.R. sample under analysis to be observed substantially free from spin-coupling as a midpoint of the quiet slot approaches the chemical shift at which a resonance occurs. The width of the quiet slot is chosen with respect to the amplitude of the decoupling RF power and the amplitude of the irradiating RF power for optimizing the decoupling effect.

In accordance with another feature of the present invention, there is provided an apparatus for decoupling spin-coupled gyromagnetic nuclei in N.M.R. spectroscopy, comprising means for generating a plurality of relatively low-frequency signals extending over a band of frequencies, a carrier suppression modulating means for modulating with said band of frequencies an RF signal having the same frequency, $f_1$, as the normal N.M.R. irradiating RF power. RF decoupling power in the form of upper sidebands and lower sidebands with an intervening frequency gap or quiet slot is thereby generated. The sidebands are of sufficient intensity for saturating resonances occurring in the corresponding positions of the N.M.R. spectrum. As the sample is subjected to both irradiating and decoupling power and is scanned in either the frequency scan or field scan mode, the quiet slot which is flanked by saturated zones progresses along the abscissa of the spectrum and enables a resonance occurring in a chemical group of the N.M.R. sample under analysis to be observed substantially free from spin-coupling as the midpoint of the quiet slot approaches the chemical shift at which the resonance occurs.

The apparatus advantageously includes means for adjusting the width of the quiet slot in either incremental or continuous fashion and for regulating the amplitude of the decoupling RF power to enable the spectroscopist to optimize the decoupling effect to suit a particular analysis without impairing the resonance signal of the chemical group under observation.

The band of low frequencies is produced by means of a plurality of oscillators having a discrete frequency separation therebetween, or alternatively, by generating a plurality of harmonics up to a predetermined limit from a low-frequency source, or alternatively, by isolating a convenient band of low-frequency noise from the output of a noise generator.

Where sidebands are generated with a frequency spacing, (i.e., ladder spacing), between members of the same species (the lower sidebands being regarded as a separate species from the upper sidebands for the purpose of identification in the present description), such as in the case of the first two alternatives referred to above, the ladder spacing and the amplitude of the sidebands are chosen for providing a spill-over of the resonance-saturating effect so that resonances occurring within the spacing are effectively saturated, although they do not coincide with either of two consecutive sidebands defining said spacing. However, too large a ladder spacing cannot be offset by increased amplitude without the risk of spilling over into the quiet slot and affecting the resonance signal under observation.

In the present context, the abscissa or horizontal axis of the N.M.R. spectrum is intended to refer to the axis along which the chemical shift is measured. The N.M.R. spectrum may extend from a conveniently low end corresponding to substantially unshielded nuclei or nuclei having an even lower chemical shift as a result of paramagnetic shielding (in contrast to diamagnetic shielding) to a conveniently high end defined, for example, by an internal reference, i.e., a substance mixed with the sample which is known to produce a well defined resonance signal at a sufficiently high-chemical shift. The chemical shift of an observed group may then be expressed as cycles per second or milligauss from the reference, according to whether frequency scan or magnetic field scan is employed.

If desired, the whole of the N.M.R. spectrum is saturated with the exception of the quiet slot, although compared with the case where only a relatively small region is saturated greater decoupling RF power will be required. In addition spill-over onto the quiet slot may prove troublesome in certain cases.

These and other objects and features of the invention will become apparent with reference to the following specification and drawings, wherein.

Figure 1:
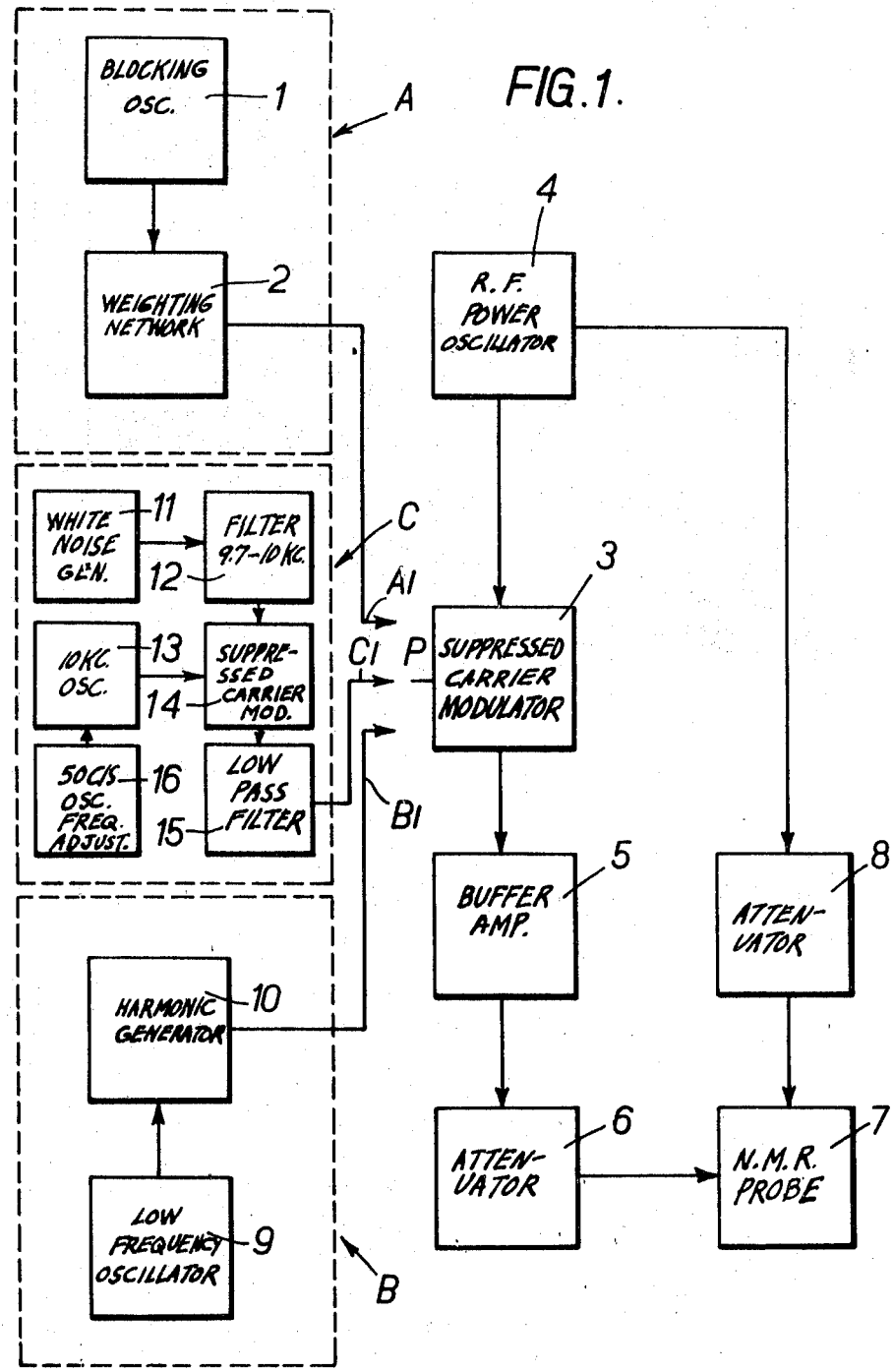
FIG. 1 is a diagram, in block form, illustrating three alternative embodiments of the invention.

The three embodiments of FIG. 1 differ only in the manner in which the band of low frequencies is produced. The description relating to elements 3 through 8 of FIG. 1 which will be given in describing a first embodiment is applicable to all three and will not therefore be repeated for the other two embodiments. Similarly, the description relating to the plotting of the N.M.R. probe input signals will only be given with respect to the first embodiment of FIG. 1, other than some additional description given in connection with the third embodiment to which the graph of FIG. 3 exclusively refers. The graph of FIG. 2 although specifically directed to the first embodiment is also useful in appreciating the operation of the second.

Referring now to FIG. 1, a series of blocking oscillators 1 is shown, the output of which is passed through a weighting network 2, to provide signals at spot frequencies of 20, 25, 30 and 35 c./s. of substantially equal amplitude. These signals are applied via the lead $A_1$ and P to a modulator means 3 and amplitude modulate through a suppressed-carrier modulator 3 a carrier frequency $f_1$ at the irradiating RF power frequency 60 Mc./s. which is derived from a source 4. In a manner well known in the art, only the first-order sideband pair due to the modulating action of each blocking oscillator is effective, and consequently the output of modulator 3 is a series of upper sidebands and a series of lower sidebands starting from the contribution made to the two series by the first-order sideband pair due to the 20 c./s. blocking oscillator and ending with the contribution of the first-order sideband pair due to the 35 c./s. oscillator. The output of modulator 3, which constitutes in fact the decoupling RF power, and has sufficient amplitude for resonance saturation is coupled through buffer amplifier 5 and attenuator 6 to an N.M.R. probe 7 of the N.M.R. spectrometer. There is also coupled to probe 7 the irradiating RF power from source 4 through an attenuator 8.

Figure 2:
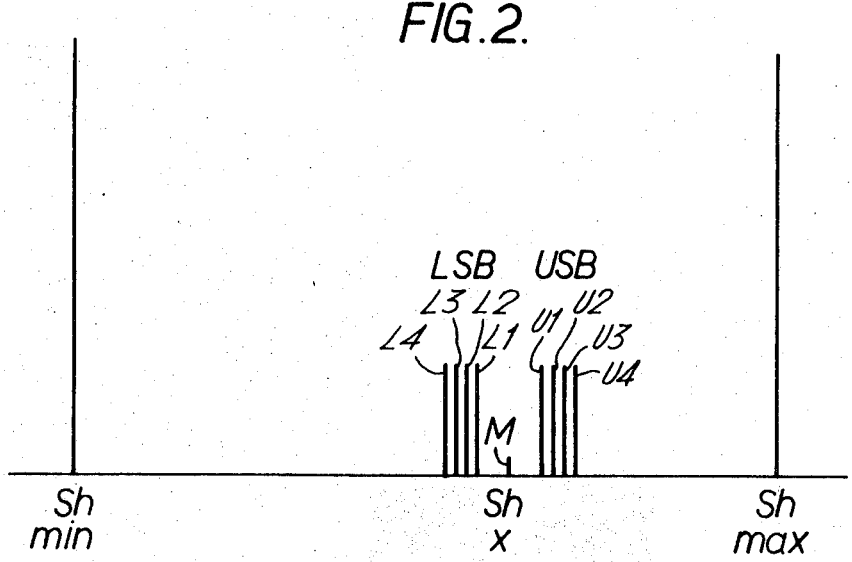
FIGS. 2 and 3 represent indicative plots, not to scale, of the probe input signals on the N.M.R. spectrum and are intended as an aid to the understanding of the three embodiments of FIG. 1.

FIG. 2 is an idealized diagrammatic representation of the probe input signals plotted on the N.M.R. spectrum wherein the vertical axis or ordinate represents signal amplitude and the horizontal axis or abscissa represents chemical shift. The N.M.R. spectrum is seen to extend between a low-chemical-shift limit $S_h$ min. and a high-chemical-shift limit $S_h$ max. the latter being conveniently chosen as a datum.

The N.M.R. spectrum is scanned between limits $S_h$ min., e.g., chemical shift of bare proton and $S_h$ max., e.g., chemical shift of T.M.S. - Tetramethylsilane - by either sweeping the frequency of the irradiating RF power or the polarizing magnetic field. In either case, as scanning progresses so the position at which the irradiating RF power may be plotted on the spectrum moves in synchronism from $S_h$ min. to $S_h$ max., if the conventional mode is adapted of scanning the N.M.R. spectrum from low- to high-chemical shifts, although the reverse mode is also possible.

In FIG. 2 the irradiating RF power reaching the probe 7 from source 4 has been plotted as the monochromatic RF line M for the particular instant when the chemical shift attained is $S_{h.x}$, which may be said to be so many cycles per second or so many milligauss downscan of limit $S_h$ max. The decoupling RF power reaching the probe 7 from modulator 3 is represented by lower sidebands LSB and upper sidebands USB which are symmetrically disposed left and right respectively of the monochromatic line M because the frequency of the suppressed carrier and that of the irradiating RF power are the same. The amplitude of the decoupling sidebands is shown in FIG. 2 to be roughly one order of magnitude greater than that of the monochromatic line M but the range available is from equal amplitude to three orders of magnitude greater.

The spacing on the abscissa of the spectrum between the members L1 and U1 of the first sideband pair defines the width of the quiet slot and similarly the spacing between L1 and L4 constitutes the width of one saturated zone and the spacing between U1 and U4 the width of the other saturated zone. The width of the quiet slot is in effect 40 cycles (corresponding roughly to 9.4 milligauss) and that of each saturated zone is 20 cycles (a little over 4.7 milligauss).

It will be clearly appreciated on the basis of the foregoing description that as the position of the monochromatic line M moves along the spectrum, the lower sidebands LSB and the upper sidebands USB retain their spatial relationship with the monochromatic line and progress with it.

In the present embodiment the width of the quiet slot is 40 cycles per second as already stated while the ladder spacing is 5 c. A slot of greater or smaller width would have been possible without altering the ladder spacing by simply arranging the blocking oscillator series to start from a frequency respectively lower (say 15 c./s.) or higher (say 25 c./s.) than in the embodiment described.

It is thus clear that having selected a ladder spacing narrow enough to insure adequate spill over effect to saturate the spectrum in between sidebands the width of the quiet slot may be independently adjusted in discrete increments. If the need arises for adjusting the width in increments smaller than consideration of the spillover effect alone would suggest, it can be easily met by reducing the frequency intervals between oscillators, which carries with it the advantage of reducing the power requirements from individual oscillators.

Attenuators 6 and 8 are intended for the purpose of suitably proportioning irradiating and decoupling RF power.

Referring again to FIG. 1 and considering the alternative embodiment of the low frequency shown by framed portion B, an oscillator 9 provides a low-frequency signal of 5 c./s. from which there is derived through a harmonic generator 10 a plurality of harmonics up to the 60th harmonic which is applied to modulator 3 via lines $B_1$ and P for modulating the 60 Mc./s. signal from unit 4. The signal coupled to probe 7 through attenuator 6 will comprise lower sidebands and upper sidebands, the two sideband species being symmetrically disposed either side of the position on the abscissa of the spectrum that corresponds to the 60 Mc./s. suppressed carrier, as in the case of the first embodiment. Apart from the greater number of sidebands involved and the smaller width of the quiet slot, the FIG. 2 graph is generally applicable to the present embodiment. Each sideband species extends 300 c./s. with a 5 c./s. ladder spacing. The width of the quiet slot is twice the original low-frequency signal, i.e., it is 10 c./s. Although this embodiment does not readily permit independence between quiet slot width and ladder spacing, this can be tolerated in all those cases where decoupling is not unduly critical and would constitute a limitation quite compatible with a relatively inexpensive instrument.

A third embodiment of the low-frequency generator included within the framed segment c comprises a white noise generator 11 which is filtered by a filter 12 to provide a 300 c./s. white noise band extending from 9.7 kc./s. to 10 kc./s. This band modulates the output of a 10 kc./s. oscillator 13 through a suppressed carrier modulator 14. The output of the modulator 14, which comprises a 0 to 300 c./s. lower sideband and a 19.7 to 20 kc./s. upper sideband, is passed through a low-pass filter 15 to yield the 0 to 300 c./s. lower sideband only. The latter output is coupled via lines $C_1$ and P to modulator 3, modulating the 60 Mc./s. signal from source 4.

Without further provision the composite signal reaching the probe 7 would be represented on the abscissa of the spectrum by the 60 Mc./s. monochromatic line flanked without intervening spacing by a continuous upper sideband 300 c./s. wide and a continuous lower sideband also 300 c./s. wide. In other words, the quiet slot would have zero width. A circuit means indicated as 16 is provided for adjustably increasing the frequency of the 10 kc./s. oscillator 13 in the range 0–50 c./s. This provides adjustment of the width of the quiet slot continuously in the range 0–100 c./s.

Figure 3:
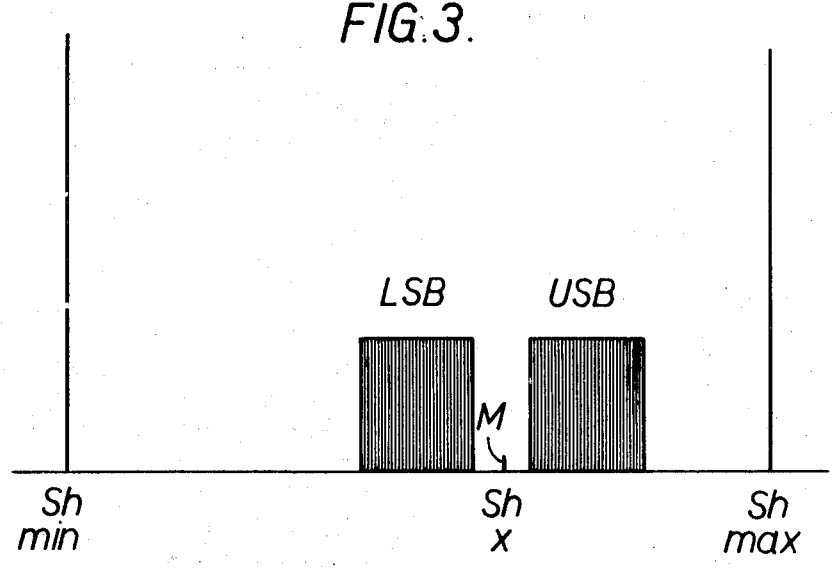

FIG. 3 is a representation of the probe input signals at chemical shift $S_{h.x}$ upon an N.M.R. spectrum extending between limits $S_h$ min. and $S_h$ max. M is the 60 Mc./s. monochromatic line as in FIG. 2, LSB is the continuous lower sideband and USB the continuous upper sideband, each sideband representing in effect a band of RF decoupling power extending over 300 c./s. of the spectrum (or the equivalent in milligauss in the case of field scan). The quiet slot is the space between the sidebands. In this embodiment the width of the quiet slot is not only independent of ladder spacing but it is also continuously adjustable. Furthermore, the effectiveness of the decoupling power is governed only by amplitude.

I claim:

1. In a nuclear magnetic resonance scanning spectrometer adapted for analyzing a sample by subjecting the sample to an irradiating radio frequency field and to a relatively intense magnetic field, an arrangement for decoupling spin coupled gyromagnetic nuclei comprising:

means providing irradiating radio frequency signals tuneable over a frequency range, a suppressed carrier amplitude modulator for providing a suppressed carrier output having a lower sideband of electromagnetic energy and an upper sideband of electromagnetic energy, means for applying simultaneously to said modulator said irradiating radio frequency signals to supply a carrier frequency signal and a modulating input signal exhibiting a plurality of modulating frequencies, means for deriving from said modulator a modulated signal including a lower sideband of electromagnetic energy extending continuously throughout said lower sideband and an upper sideband of electromagnetic energy extending continuously throughout said upper sideband with said upper and lower sidebands being separated by a predetermined frequency band that defines a quiet slot characterized by the absence of a carrier signal and modulation components, means for tuning said irradiating radio frequency signal to move said signal and slot throughout a frequency spectrum, and means for applying said modulated signal and said irradiating radio frequency signal to said sample.

2. The apparatus as claimed in claim 1 wherein said modulating input signal means is adapted for altering the frequency separation between upper and lower sidebands.

3. The apparatus as claimed in claim 2 wherein the modulating means is adapted for altering the frequency separation in discrete increments of frequency.

4. The apparatus as claimed in claim 1 wherein said modulating input signal means is adapted for continuously altering the frequency separation between upper and lower sidebands.

5. The apparatus as claimed in claim 3 wherein said modulating input signal means comprises a plurality of oscillators which provide said plurality of input signals extending over a predetermined range of frequencies in equal frequency increments and a bandwidth of said frequency band is adjustable by selecting an oscillator providing a desired lowest frequency.

6. The apparatus as claimed in claim 1, wherein said modulating signal input means comprise a low-frequency source and means for generating a plurality of harmonics of the low frequency covering a band of low frequencies in relatively small frequency increments.

* * * * *